United States Patent
Tacy et al.

(10) Patent No.: US 11,696,011 B2
(45) Date of Patent: Jul. 4, 2023

(54) PREDICTIVE FIELD-OF-VIEW (FOV) AND CUEING TO ENFORCE DATA CAPTURE AND TRANSMISSION COMPLIANCE IN REAL AND NEAR REAL TIME VIDEO

(71) Applicant: Raytheon Company, Waltham, MA (US)

(72) Inventors: Matthew J. Tacy, Boston, MA (US); John A. Cogliandro, Dedham, MA (US); Allan Mayorga, Salem, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/507,111

(22) Filed: Oct. 21, 2021

(65) Prior Publication Data

US 2023/0131642 A1    Apr. 27, 2023

(51) Int. Cl.
| | | |
|---|---|---|
| *G06V 20/20* | (2022.01) | |
| *H04N 19/00* | (2014.01) | |
| *G06T 7/20* | (2017.01) | |
| *H04N 23/61* | (2023.01) | |
| *H04N 23/60* | (2023.01) | |
| *H04N 23/63* | (2023.01) | |
| *H04N 23/695* | (2023.01) | |

(52) U.S. Cl.
CPC ............... *H04N 23/61* (2023.01); *G06T 7/20* (2013.01); *G06V 20/20* (2022.01); *H04N 23/634* (2023.01); *H04N 23/64* (2023.01); *H04N 23/695* (2023.01)

(58) Field of Classification Search
None
See application file for complete search history.

(56) References Cited

U.S. PATENT DOCUMENTS

| | | |
|---|---|---|
| 4,992,883 A | 2/1991 | Tsunekawa |
| 5,594,469 A | 1/1997 | Freeman et al. |
| 6,356,437 B1 | 3/2002 | Mitchell et al. |
| (Continued) | | |

FOREIGN PATENT DOCUMENTS

| | | |
|---|---|---|
| CN | 106228544 A | 12/2016 |
| JP | 2000092473 A | 3/2000 |
| (Continued) | | |

OTHER PUBLICATIONS

"Canadian Application Serial No. 3076505, Voluntary Amendment filed Apr. 28, 2020", 11 pgs.

(Continued)

*Primary Examiner* — Edemio Navas, Jr.
(74) *Attorney, Agent, or Firm* — Schwegman Lundberg & Woessner, P.A.

(57) ABSTRACT

To prevent the capture and transmission of excluded data, the current pose and motion of a video camera are used to predict a pose and predicted FOV for the video camera over one or more future frames. The predicted pose and predicted FOV are used to generate cues to enforce an alignment condition to an allowed object or to prevent capture of a disallowed object. If the cues fail, an interrupt is generated to prevent capture of disallowed objects in the video signal and perhaps to deactivate the video camera. The predicted FOV prevents excluded data from entering the video signal and reaching circuitry or being processed downstream of the video camera. This can be implemented in real or near real time.

28 Claims, 7 Drawing Sheets

(56) References Cited

U.S. PATENT DOCUMENTS

| | | |
|---|---|---|
| 6,970,183 B1 | 11/2005 | Monroe |
| 7,110,909 B2 | 9/2006 | Friedrich et al. |
| 7,126,558 B1 | 10/2006 | Dempski |
| 7,372,451 B2 | 5/2008 | Dempski |
| 8,432,559 B2 | 4/2013 | Kobayashi |
| 8,749,343 B2 | 6/2014 | Cirker |
| 9,179,105 B1 | 11/2015 | Zeira et al. |
| 9,582,709 B2 | 2/2017 | Wang et al. |
| 10,089,790 B2 | 10/2018 | Lawson et al. |
| 10,122,825 B1 | 11/2018 | Petty |
| 10,142,410 B2 | 11/2018 | Giffin et al. |
| 10,403,046 B2 | 9/2019 | Pinti et al. |
| 10,425,403 B2 | 9/2019 | Chen et al. |
| 10,440,348 B2 | 10/2019 | Koppal et al. |
| 10,531,137 B1* | 1/2020 | Matak ............... A63B 24/0062 |
| 10,602,054 B2 | 3/2020 | Jung et al. |
| 10,674,972 B1 | 6/2020 | Piatrou et al. |
| 10,679,425 B2 | 6/2020 | Pinti et al. |
| 10,878,584 B2 | 12/2020 | Agata et al. |
| 2005/0018879 A1 | 1/2005 | Ito et al. |
| 2008/0030575 A1 | 2/2008 | Davies et al. |
| 2010/0002071 A1 | 1/2010 | Ahiska |
| 2011/0130949 A1* | 6/2011 | Arrasvuori ......... G01C 21/3682 701/532 |
| 2011/0142369 A1* | 6/2011 | Aila ...................... H04N 5/235 382/284 |
| 2012/0074296 A1 | 3/2012 | Hammes et al. |
| 2012/0087546 A1 | 4/2012 | Focke et al. |
| 2012/0203487 A1 | 8/2012 | Johnson et al. |
| 2013/0278778 A1 | 10/2013 | Kagei |
| 2014/0168084 A1 | 6/2014 | Burr |
| 2014/0210856 A1 | 7/2014 | Finn et al. |
| 2015/0186728 A1 | 7/2015 | Kimura |
| 2015/0302647 A1 | 10/2015 | Osterhout et al. |
| 2016/0026253 A1 | 1/2016 | Bradski et al. |
| 2016/0080642 A1 | 3/2016 | Jung et al. |
| 2016/0080652 A1 | 3/2016 | Shirota et al. |
| 2016/0133054 A1 | 5/2016 | Honjo et al. |
| 2016/0335524 A1 | 11/2016 | Bremer et al. |
| 2016/0349228 A1* | 12/2016 | Kester ................... G01J 5/0014 |
| 2016/0378939 A1 | 12/2016 | Baumberger et al. |
| 2017/0193279 A1 | 7/2017 | Kusens et al. |
| 2017/0273549 A1 | 9/2017 | Nazareth et al. |
| 2017/0323062 A1 | 11/2017 | Djajadiningrat |
| 2017/0339295 A1 | 11/2017 | Honda |
| 2018/0092698 A1 | 4/2018 | Chopra et al. |
| 2018/0259673 A1 | 9/2018 | Cui et al. |
| 2018/0309808 A1 | 10/2018 | Andon et al. |
| 2018/0330096 A1 | 11/2018 | Breindel et al. |
| 2018/0330110 A1 | 11/2018 | Nelson et al. |
| 2018/0336737 A1 | 11/2018 | Varady et al. |
| 2018/0341812 A1 | 11/2018 | Floor et al. |
| 2019/0066403 A1 | 2/2019 | Nagura et al. |
| 2019/0088026 A1 | 3/2019 | Isaacson et al. |
| 2019/0122378 A1 | 4/2019 | Aswin |
| 2019/0122437 A1* | 4/2019 | Pinti ....................... G06V 20/20 |
| 2019/0188930 A1 | 6/2019 | Tsukahara |
| 2019/0335115 A1 | 10/2019 | Kumai |
| 2020/0082631 A1* | 3/2020 | Yoon .................. H04M 1/72454 |
| 2020/0143643 A1 | 5/2020 | Kusens et al. |
| 2020/0174261 A1 | 6/2020 | Uenohara et al. |
| 2020/0210726 A1 | 7/2020 | Yang et al. |
| 2020/0334919 A1 | 10/2020 | Bowen |
| 2020/0394430 A1 | 12/2020 | Ahmed et al. |
| 2021/0070311 A1* | 3/2021 | Patychuk ............. G05D 1/0248 |
| 2021/0224885 A1 | 7/2021 | Yarra et al. |

FOREIGN PATENT DOCUMENTS

| | | |
|---|---|---|
| JP | 2000228741 A | 8/2000 |
| JP | 2006025250 A | 1/2006 |
| JP | 2006293605 A | 10/2006 |
| JP | 2011097238 A | 5/2011 |
| JP | 2015126352 A | 7/2015 |
| JP | 2016167688 A | 9/2016 |
| JP | 2017108263 A | 6/2017 |
| JP | 2017529635 A | 10/2017 |
| JP | 2021118499 A | 8/2021 |
| WO | WO-2010094065 A1 | 8/2010 |
| WO | WO-2015170409 A1 | 11/2015 |
| WO | WO-2017027338 A1 | 2/2017 |
| WO | WO-2017177019 A1 | 10/2017 |
| WO | WO-2017204081 A1 | 11/2017 |

OTHER PUBLICATIONS

"Japanese Application Serial No. 2021-112687, Notification of Reasons for Refusal dated Aug. 2, 2022", w/ English Translation, 6 pgs.

"European Application Serial No. 18789290.6, Communication Pursuant to Article 94(3) EPC dated Jan. 20, 2021", 7 pgs.

"European Application Serial No. 18789290.6, Respoonse filed May 7, 2021 to Communication Pursuant to Article 94(3) EPC dated Jan. 20, 2021", 21 pgs.

"XMReality 4.4 Manual, XMReality Remote Guidance, "Like Being There" XMReality AB, 2015.", (2015), 49 pages.

Henderson, Steven, et al., "Augmented Reality for Maintenance and Repair (ARMAR)", Air Force Research Laboratory Human Effectiveness Directorate Warfighter Readiness Research Division Logistics Readiness Branch Wright-Patterson AFB OH 45433-7604, (Aug. 2007), 70 pages.

Henderson, Steven, et al., "Evaluating the Benefits of Augmented Reality for Task-Localization in Maintenance of an Armored Personnel Carrier Turret", IEEE International Symposium on Mixed and Augmented Reality 2009 Science and Technology Proceedings, (Oct. 19-22, 2009), 10 pages.

Molineros, Jose, et al., "Computer vision for guiding manual assembly", Proceedings of the 2001 IEEE International Symposium on Assembly and Task Planning, (May 29-29, 2001), 7 pages.

Reiners,, Dirk, et al., "Augmented Reality for Construction Tasks: Doorlock Assembly", http://www.iqd.fhg.de/www/iqd-a4/, (Nov. 1998), 10 pages.

Smith, Randall, et al., "Estimating Uncertain Spatial Relationships in Robotics", Machine Intelligence and Pattern Recognition 1, (Jan. 1986), 435-461.

Tang, Arthur, et al., "Comparative Effectiveness of Augmented Reality in Object Assembly", Paper: New Techniques for Presenting Instructions and Transcripts CHI 2003: New Horizons, (Apr. 5-10, 2003), 8 pages.

U.S. Appl. No. 17/733,456, filed Apr. 29, 2022, Computer/Human Generation, Validation and Use of a Ground Truth Map to Enforce Data Capture and Transmission Compliance in Real and Near Real Time Video of a Local Scene.

U.S. Appl. No. 15/907,853, U.S. Pat. No. 10,403,046, filed Feb. 28, 2018, Field of View (FOV) and Key Code Limited Augmented Reality (AR) to Enforce Data Capturie of Transmission Compliance.

U.S. Appl. No. 16/416,939, U.S. Pat. No. 10,679,425, filed May 20, 2019, Field of View (FOV) and Key Code Limited Augmented Reality (AR) to Enforce Data Capturie and Transmission Compliance.

U.S. Appl. No. 17/507,073, filed Oct. 21, 2021, Time-Delay to Enforce Data Capture and Transmission Compliance in Real and Near Real Time Video.

"European Application Serial No. 21188467.1, Extended European Search Report dated Nov. 2, 2021", 9 pgs.

"European Application Serial No. 21188467.1, Response filed Jan. 7, 2022 to Extended European Search Report dated Nov. 2, 2021", 16 pgs.

"International Application Serial No. PCT/US2018/052626, Written Opinion dated Dec. 7, 2018", 9 pgs.

"International Application Serial No. PCT/US2018/052626, International Preliminary Report on Patentability dated Apr. 21, 2020", 10 pgs.

"International Application Serial No. PCT/US2018/052626, International Search Report dated Dec. 7, 2018", 4 pgs.

(56) References Cited

OTHER PUBLICATIONS

"Korean Application Serial No. 10-2020-7007808, Notice of Preliminary Rejection dated Nov. 30, 2021", w/ English translation, 5 pgs.
"Korean Application Serial No. 10-2020-7007808, Response filed Jan. 25, 2022 to Notice of Preliminary Rejection dated Nov. 30, 2021", with machine translation, 24 pgs.
"Korean Application Serial No. 10-2020-7007808, Voluntary Amendment filed May 21, 2020", with English translation of claims, 29 pgs.
"International Application Serial No. PCT/US2022/047126, Invitation to Pay Additional Fees mailed Feb. 1, 2023", 12 pgs.
"International Application Serial No. PCT/US2022/047144, Invitation to Pay Additional Fees mailed Jan. 31, 2023", 15 pgs.
"Japanese Application Serial No. 2021-112687, Response filed Oct. 31, 22 to Notification of Reasons for Refusal dated Aug. 2, 2022", with English translation of claims, 10 pgs.
"Kuwait Application Serial No. KW/P/2020/138, Office Action dated Dec. 27, 2022", 5 pgs.
Vollmer, Michael, et al., "High speed and slow motion: the technology of modern high speed cameras", Physics Education, Institute of Physics Publishing, Bristol, GB, vol. 46, No. 2, (Mar. 3, 2011), 191-202.
"U.S. Appl. No. 17/507,073, Notice of Allowance dated Dec. 22, 2022", 10 pgs.
"U.S. Appl. No. 17/507,073, Supplemental Notice of Allowability dated Jan. 5, 2023", 2 pgs.

\* cited by examiner

PREDICTIVE FIELD-OF-VIEW (FOV) AND CUEING TO ENFORCE DATA CAPTURE AND TRANSMISSION COMPLIANCE IN REAL AND NEAR REAL TIME VIDEO

BACKGROUND OF THE INVENTION

Field of the Invention

This invention relates to the capture and processing of video to enforce data capture and transmission compliance in real or near real-time private, restrictive or secure environments.

Description of the Related Art

Video camera technology is increasingly ubiquitous in the world today. Devices such as head-mounted cameras, robotically controlled cameras, semi-autonomous or autonomous robots, cellular telephones, desktop or table computers, near-eye displays and hand-held game systems, for example, may include cameras and associated software to enable video capture, display and transmission. These devices are being used to provide unidirectional or bi-directional video communication in real or near real time. Privacy and security concerns exists when, intentionally or unintentionally, video that should not be captured, stored, displayed or transmitted is. A person's, company's or country's privacy may be violated, possibly illegally. In certain restrictive, such as military or company proprietary or secure environments, strict controls exist governing what visual information may be captured, stored, displayed or transmitted.

In an effort to restrict unwanted video capture or transmission, some existing systems monitor the video as it is captured. These systems use human processing, artificial intelligence (AI), computational algorithms, or a combination thereof to identify problematic visual information (e.g. a person's face or a company's proprietary information) and then either removes or obscures the information from the video file data. These systems may even shut off the recording device to prevent further capture of problematic information. However, the existing systems described all capture, store, and process the problematic information. Because the problematic data is stored (albeit sometimes only temporarily) and processed, data spill risks still exist, and therefore these systems cannot meet requirements for certain secure or restrictive environments. The processing required to remove or obscure the information from the video file makes these systems incompatible with applications that require real or near real time video capture and transmission.

Video capture that enforces data capture and transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems. In these applications, it may be necessary to capture and uni-directionally or bi-directionally transmit video of a local scene that includes problematic information or real or near real time to facilitate efficient and effective communication. As a special case, data capture and transmission compliance may be implemented in an Augmented Reality environment.

Augmented Reality (AR) refers to the generation of two or three dimensional (3D) video graphics or other media such that they are overlaid on and registered with surrounding objects in the environment. Man-made "markers" aka "sources" having a unique and easily identifiable signature may be placed on the user, on the object or in the scene and used for various purposes. These markers have been used to identify and locate specific objects, to trigger the display of computer generated media or to determine the position and pose of the user.

In certain video or AR environments such as a remote repair or inspection, a concern, primarily of the customer and which is heightened by the video camera industry push to maximize the FOV, is that the user of the video being captured and transmitted or viewed locally (either the field technician or expert, but primarily the field technician), may turn away from the object of interest, intentionally or unintentionally, and capture video of another portion of the scene that should not be captured or transmitted. Some level of data capture and transmission compliance may be required by customer demands, industry regulations, national security or country specific laws to avoid unintentional or intentional broad FOV transmission. Current techniques include physically draping with a cloth or tarp the areas around the object of interest to prevent capture in the video signal, mechanically narrow the FOV, or sequestering the video prior to transmission and having a security-cleared domain expert review and edit the video signal post-capture. These are time consuming activities. Even more common, and more costly is the removal of the equipment in question to a specialized secure space, such as an empty garage or hanger so that there are no extraneous items in the scene. In many cases removing equipment, physical draping or post-capture editing are either not sufficient to satisfy the compliance requirements or are impractical and costly to implement in a quasi real-time interactive situation. In some situations there are country laws that would prevent any type of post-capture editing for national security and ITAR—International Traffic and Arms Regulations reasons.

U.S. Pat. Nos. 10,403,046 and 10,679,425 entitled "Field of View (FOV) and Key Code Limited Augmented Reality to Enforce Data Capture and Transmission Compliance" disclosed enforcement of an alignment condition between the video camera's pointing direction and a marker in the scene to avoid capture of excluded data in a real-time interactive situation. This may be done, for example, by determining whether the video camera pointing direction satisfies an alignment condition to a marker in the local scene such that the video camera FOV lies within a user-defined allowable FOV about the marker. A separate sensor may be used to detect the presence of the marker within a sensor FOV to satisfy the alignment condition. The camera or sensor FOV may be reduced to create a buffer zone to provide additional assurance that the camera FOV does not stray outside the allowable FOV. If the alignment condition is not satisfied, the video camera is controlled to exclude at least a portion of the camera FOV that lies outside a user-defined allowable FOV from capture within the video signal. For example, this could be done by turning the video camera off or by narrowing its FOV. Markers may also be used as a fail safe to ensure imagery in a particularly sensitive area of the scene is neither captured nor transmitted. If the separate sensor detects these markers, the video camera is shut down. The system may cue the user e.g., "green" means the alignment condition is satisfied, "yellow" means the technician's eyes are beginning to wander and "red" means the alignment condition is violated and the camera is disabled. In this system, the use of a separate sensor to enforce the alignment condition and to detect other markers in sensitive areas is specifically designed for more rigorous environments, in which compliance requires that portions of the scene or tagged objects cannot be captured (detected) by the video camera itself, much less output into the video signal and for environments in which real or quasi real-time interaction is required.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method for predicting the FOV of a video camera to provide for enforcement of data capture and transmission compliance of real and near real time video.

To provide for enforcement of data capture and transmission compliance of real or near real time video, the present invention predicts a future FOV of the video camera to recognize disallowed objects and cue or control the video camera to prevent their capture in the video signal. The predicted FOV can also be used to enforce an alignment condition of the video camera to an allowed object.

In an embodiment, a three-dimensional ground truth map of the local scene including one or more objects is generated using a 3D sensor such as a 3D camera, LIDAR or sonar. One or more of the objects in the ground truth map are identified as disallowed and possibly allowed. 2D or 3D models may be used to represent the identified allowed and disallowed objects. A video camera captures a video signal at a frame rate within a camera field-of-view (CFOV) in a pointing direction in the local scene. The system determines a pose including a location and an orientation of the video camera within the local scene for a current frame and computes a predicted pose and predicted FOV (PFOV) for one or more future frames from the pose for the current frame and measurements of velocity and acceleration for the video camera. The one or more predicted FOV are compared to the ground truth map to recognize and locate disallowed, and possibly allowed, objects. If a disallowed object is recognized, the video camera is controlled to prevent capture of disallowed objects and their inclusion in the one or more future frames of the video signal.

In certain embodiments, a cue may be generated to change the video camera pointing direction to prevent capture of disallowed objects and their inclusion in the one or more future frames of the video signal. After generating the cue, the predicted FOV is updated to determine whether the updated predicted FOV includes the disallowed object. If the cue fails to prevent capture of the disallowed object in the updated predicted FOV, then the video camera is controlled to prevent capture of the disallowed object and its inclusion in the video signal. As a result, disallowed objects do not make it into the video signal and thus do not reach downstream circuitry, processing or a network to which the video camera is connected.

In different embodiments, instead of just being based on their content, objects may be defined and disallowed based on other attributes. For example, any object that is identified as having a distance from the video camera that is either too close or too far may be designated as disallowed. The rate of motion (e.g., velocity and acceleration) of an object entering the local scene may be defined as an object and disallowed if the rate of motion exceeds a maximum value. In addition, the rate of motion (e.g., velocity and acceleration) of the video camera may be defined as an object and disallowed if the rate of motion exceeds a maximum value.

In different embodiments, the video camera is trained on an allowed object and away from disallowed objects. The system determines whether the camera's current and predicted pointing directions satisfy an alignment condition to one of the allowed objects. If not, the system generates a cue to change the video camera pointing direction to enforce the alignment condition. If the cue fails to enforce the alignment condition, the video camera is deactivated. The ground truth map can be used to verify recognized allowed objects.

In different embodiments, the video camera pointing direction is slaved or controlled by user motion (e.g. a head mounted video camera), a user-controlled manual manipulator (e.g. a robotic arm) or a fully automated manual manipulator (e.g. an AI controlled robotic arm or semi-autonomous or autonomous robot). For example, an audio, video or vibrational cue may be presented to the user to turn the user's head away from the disallowed object prior to capturing the disallowed object or back towards the allowed objection prior to violating the alignment condition. Similarly, a cue may be presented to the user of the robotic arm to turn the camera away prior to capturing the disallowed object or back towards the allowed object. In a fully automated system, the cue may override the system and cause the camera to point away from the disallowed object or towards the allowed object.

In different embodiments, the video camera may be controlled to prevent capture of disallowed objects in a variety of ways. The video camera may be mechanically controlled to change its pointing direction, optically controlled to narrow the CFOV or to blur the disallowed object (e.g. changing the f/#) before it reaches the detector array, changing lighting of the local scene to cause blinding of the sensor, or electrically controlled to interrupt power, disable the electrochemical layer of the detector array, amplifier or A/D converter in the ROIC or selectively turn off pixels on the disallowed object.

These and other features and advantages of the invention will be apparent to those skilled in the art from the following detailed description of preferred embodiments, taken together with the accompanying drawings, in which:

DETAILED DESCRIPTION OF THE INVENTION

Video capture that enforces data capture and transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems. In these applications, it may be necessary to capture and uni-directionally or bi-directionally transmit video of a local scene that includes problematic information or real or near real time to facilitate efficient and effective communication. As a special case, data capture and transmission compliance may be implemented in an Augmented Reality environment. The video camera pointing direction is slaved or controlled by user motion (e.g. a head mounted video camera or hand-held video camera), a user-controlled manual manipulator (e.g. a robotic arm) or a fully automated manual manipulator (e.g. an AI controlled robotic arm or semi-autonomous or autonomous robot).

The present invention is directed to these and other similar application in which some level of data capture and transmission compliance may be required by customer demands, industry regulations, national security or country specific laws. In certain instances, compliance may require that portions of a scene or specifically tagged objects cannot be included within the video signal output by the video camera for display or transmission. In other more rigorous environments, compliance may require that portions of the scene or tagged objects cannot be stored in the camera's memory chip, much less output into the video signal. The memory chip may be only a memory chip or may be video display or video transmission chip that includes the permanent memory. The required level of compliance may be determined by a number of different factors and may change between or even during capture and display or transmission of the video signal.

The present invention predicts a FOV for video camera to recognize disallowed objects and control the video camera to prevent capture of disallowed objects and their inclusion in the one or more future frames of the video signal. The predicted FOV can also be used to enforce an alignment condition of the video camera to an allowed object. Cues can be used to prompt a correction in the video camera pointing direction to prevent capture of a disallowed object before it occurs or to enforce the alignment condition before it is lost. If the cues fail to cause corrective action, the video camera is then controlled to prevent capture of the disallowed objects or to punish loss of the alignment condition. As a result, disallowed objects do not make it into the video signal and thus do not reach downstream circuitry, processing or a network to which the video camera may be connected. This can be implemented in real or near real time or slower if the application does not demand such performance with a delay line or temporary memory chip positioned between the video camera's ROIC and memory chip. For example, the slowest acceptable video frame rate for most users is approximately 24 frames/sec (fps), or approximately 42 milliseconds (ms). A time-delay of less than 42 ms would be a generally acceptable to most users. A fast video camera is 120 fps or about 8 ms. At these frame rates, a delay of a single frame is certainly real time. The predicted FOV can be utilized to enforce data capture and transmission compliance for a single image or a sequence of images in the video signal.

Figure 1:
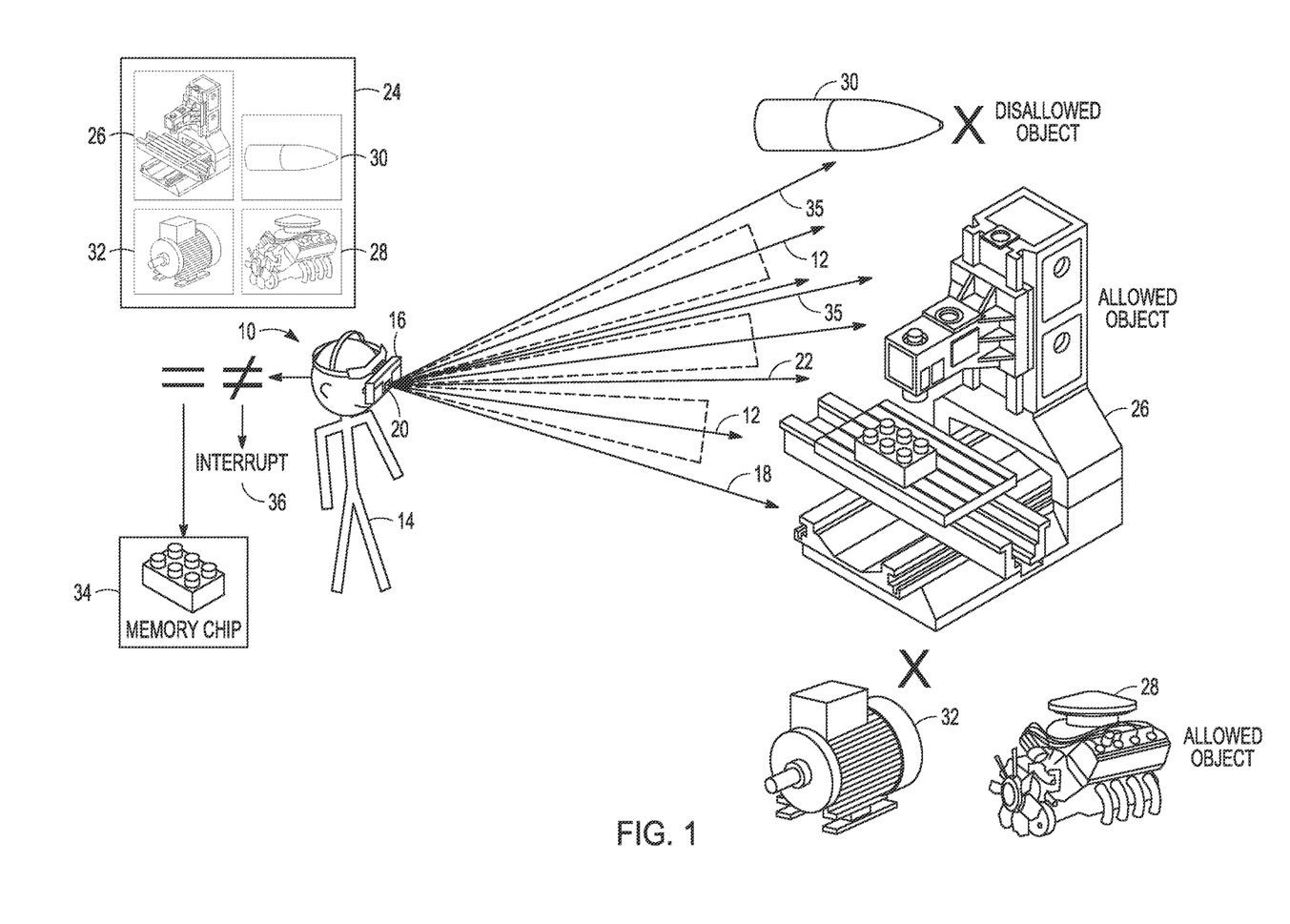
FIG. 1 is an illustration of a system in which a predicted FOV for the video camera provides for predictive cueing and enforcement of data capture and transmission compliance of real and near real time video.

Referring now to FIG. 1, in an embodiment a video capture, display and transmission device 10 such as a pair of video goggles or a hand-held unit (e.g. a tablet or cell phone) has a pointing direction 12 that is slaved to technician motion (e.g., where a field technician 14 is looking or pointing the unit). Device 10 includes a sensor 16 (e.g. a 3D camera, LIDAR, Sonar) configured to capture a sensed signal in a sensor FOV 18 about pointing direction 12 and a video camera 20 (e.g. a 2D or 3D CMOS, CCD or SWIR camera) configured to capture light within a camera FOV 22 about pointing direction 12 and within the sensor FOV 18 to form a video signal. Sensor 16 is used to generate a 3D ground truth map 24 of a local scene in which specific objects 26 and 28 are indicated as allowed and specific objects 30 and 32 are indicated as disallowed. The objects may be represented in the ground truth map as real sensor data or as computer-generated models.

In this example, field technician 16 may be moving around inside a manufacturing facility to confirm the existence and location of certain objects, repair or maintain certain objects or to use certain objects. These objects may be considered to be "allowed" objects. The technician may even be prompted or cued to maintain the pointing direction 12 on a specified object to perform a certain task (e.g., verification, repair, use). The field technician 16 can capture, display and transmit "allowed" objects. The field technician 16 cannot capture in memory, much less display or transmit, "disallowed" objects.

What constitutes allowed or disallowed objects may depend on the application, the type of objects in the local scene, the permissions of the field technician, supervisor and any remote staff, and any specific restrictions placed on excluded data and transmission compliance. This information may be stored in the device. The device processes the sensed signal to detect and locate objects and determine whether they are allowed or disallowed objects. Background in the local scene and ground truth map may default to either allowed or disallowed. Objects that move into the scene that are not in the ground truth map are suitably disallowed until identified and marked as allowed. Similarly objects that are unrecognized are suitably disallowed until identified and marked as allowed. Instead of just being based on their content, objects may be defined and disallowed based on other attributes. For example, any object that is identified as having a distance from the video camera that is either too close (<min distance) or too far (>max distance) may be designated as disallowed. The rate of motion (e.g., velocity and acceleration) of the video camera or an object that enters the local scene may be defined as an object and disallowed if the rate of motion exceeds a maximum value. The device compares recognized objects to the ground truth map to verify whether it's the same object, allowed or disallowed and the location, which greatly improves the accuracy and confidence of the object recognition.

To prevent the capture and transmission of excluded data, one or more predicted camera FOV 35 for the video camera are used to recognize disallowed objects and control the video camera to interrupt and stop images from being transferred into a memory chip 34 where the video signal is formed. For example, if the pointing direction 12 for both the current camera FOV 22 and the one or more predicted camera FOV 35 satisfies an alignment condition (e.g., pointing direction within a few degrees of a preferred line-of-sight (LOS)) to allowed object 26 to perform some task and do not include any disallowed objects 30 or 32, the images captured by the video camera are transferred to memory chip 34 where they are formed into the video signal that may be displayed to the field technician or transmitted to a remote location (e.g. storage or display to other remote users).

If both conditions are satisfied, the device may generate a positive cue (e.g. green "good") to reinforce the user's focus on the allowed object. If the user's pointing direction starts to wander away from an allowed object or towards a disallowed object but has not yet violated either condition, the device may generate a prompt cue (e.g. yellow "move left") to take corrective action. If the user's pointing direction has changed to the point that either the alignment condition is violated or capture of a disallowed object is imminent, the device may both control the video camera to prevent capture of disallowed objects and their inclusion in the video signal or deactivate the camera and issue an interrupt cue (e.g. red "Deactivate Video Camera").

If either condition is violated, the device issues an "interrupt" 36 that controls the camera to prevent capture of the video signal including disallowed objects or when the alignment condition is not satisfied. For a violation of the alignment condition, the video camera is typically turned off either by interrupting power to the video camera, deactivating the electrochemical top layer of the detector array or ROIC or by pointing the video camera in a completely different direction. For a violation of moving to capture a disallowed object, in addition to these options, the video camera may be controlled to optically narrow the camera FOV or to selectively blur portions of the camera FOV (e.g. changing the f/#), changing lighting of the local scene to cause blinding of the sensor, or selectively turn off or blur pixels on the detector array corresponding to the disallowed object The same method can be applied to a remotely user-controlled robotic arm that points the video camera or a fully autonomous robot that uses a video camera as part of its vision system. In the case of the robotic arm, "time-delay" can ensure that protected data is not captured and transmitted to remote site, where the user is located or elsewhere. In the case of a fully autonomous robot, "time-delay" can ensure that protected data is not captured and used by the robot or transmitted elsewhere.

The method can be applied to applications and local scenes in which only allowed objects are present or only disallowed objects are present.

Figure 2:
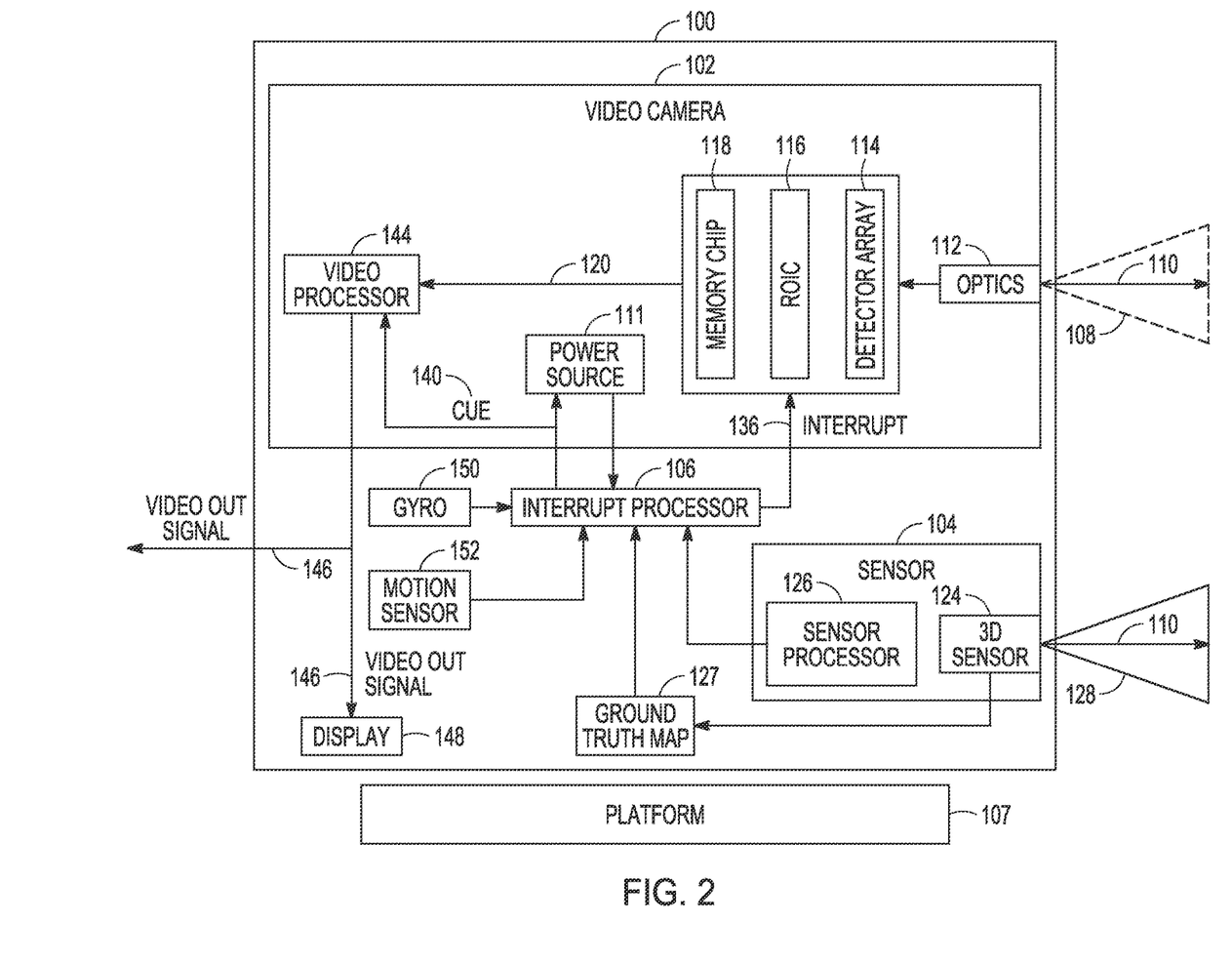
FIG. 2 is a block diagram of an embodiment of a video capture and transmission device to enforce data capture and transmission compliance of real and near real time video.
Figure 3:
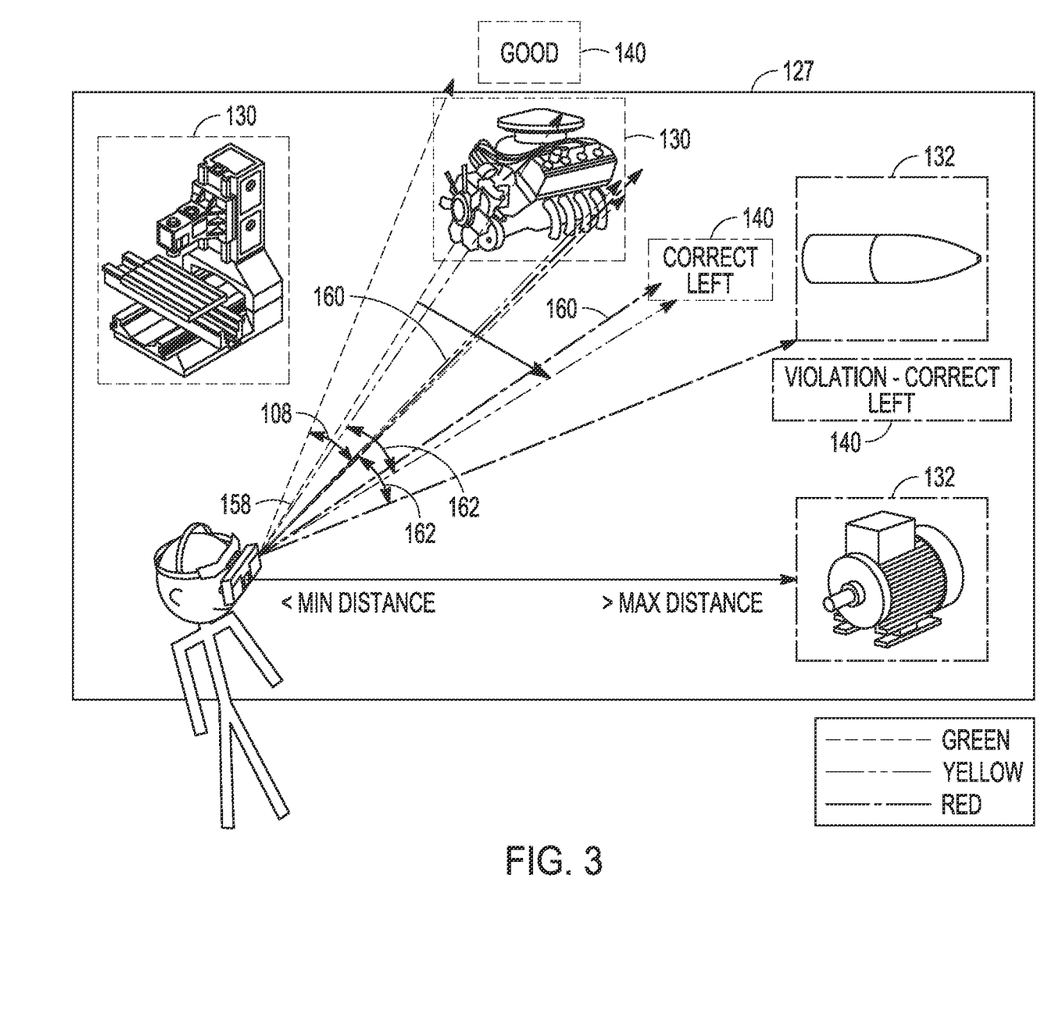
FIG. 3 is an illustration of a three-dimensional ground truth map of the local scene including both allowed and disallowed objects against which to identify and locate objects in the predicted FOV.
Figure 4:
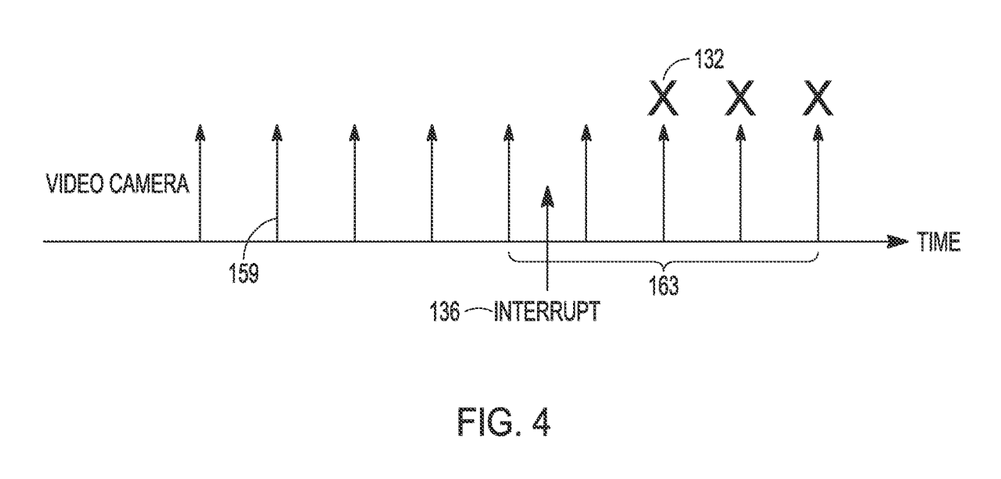
FIG. 4 is an illustration of a sequence of captured image frames that form a video signal in which the predicted FOV is used to issue an interrupt before image frames containing a disallowed object are captured in the video signal.

Referring now to FIGS. 2, 3 and 4, in an embodiment a video capture and display device 100 includes a video camera 102, a sensor 104 and an interrupt processor 106 to control the video camera to prevent disallowed objects 132 from being captured in the video signal and to enforce an alignment condition to allowed objects 130. Device 100 is coupled to a "platform" 107 such as a user, robotic arm, robot etc. that controls the pointing direction of the device.

Sensor 104 includes a 3D sensor 124 such as a 3D camera, LIDAR or sonar and a sensor processor 126 to capture a sensed signal within a sensor FOV (SFOV) 128 along a pointing direction 110 for form a three-dimensional ground truth map 127 in which one or more allowed or disallowed objects are identified. The identified objects may be represented by the sensed signal or a computer generated model. As will be discussed later, the sensor may also be used to determine the camera pose. Sensor 104 is isolated from video processor 144 or any other circuitry or network downstream of video capture and display device 100 to which the video camera may be connected to distribute the video signal.

Video camera 102 captures light within a camera field-of-view (CFOV) 108 in pointing direction 110 in the local scene. The video camera suitably includes a power source 111, optics 112 to collect light within the CFOV, a detector array 114 to sense and integrate light to form an image converting photons to electrons, a read out integrated circuit (ROIC) 116, which includes an amplifier and an A/D converter, to read out a sequence of images at a frame rate, and a memory chip 118 to store the sequence of images to form a video signal 120.

The interrupt processor 106 determines a pose 158 including a location and an orientation of the video camera within the local scene for a current frame 159. This may be done either thru use of a gyroscope 150 that measures the 6 DOF pose (e.g. x,y,z and rotation about x,y,z axes) of the video camera or by matching the sensed signal in the sensor FOV 128 for the current frame against ground truth map 127. Interrupt processor 106 computes a predicted pose 160 and predicted FOV (PFOV) 162 for one or more future frames 163 from the pose for the current frame and measurements of velocity and acceleration, suitably in 6 DOF, for the video camera provided by a motion sensor 152. The interrupt processor 106 compares one or more predicted FOV 162 to the ground truth map to recognize and locate disallowed objects 132, and possibly allowed objects 130.

Because of the predictive nature of the system, interrupt processor 106 may generate a cue 140 to change the video camera pointing direction to prevent capture of disallowed objects and their inclusion in the one or more future frames of the video signal without having to control or turn-off the video camera. Cue 140 is configured to preempt movement of the video camera towards the disallowed object before it occurs. After generating the cue, the interrupt processor updates the one or more predicted FOV to determine whether the updated predicted FOV includes the disallowed object. If the cue fails to prevent capture of the disallowed object in the updated predicted FOV, then the interrupt processor 106 issues the interrupt 136 to control the video to prevent capture of the disallowed object and its inclusion in the video signal.

If the video camera is trained on allowed object 130 and away from disallowed objects 132, the interrupt processor 106 determines whether the camera's current and predicted pointing directions satisfy an alignment condition to one of the allowed objects. If not, the system generates a cue 140 to change the video camera pointing direction to enforce the alignment condition. If the cue fails to enforce the alignment condition, the video camera is deactivated. Loss of the alignment condition does not necessarily mean that the camera is going to capture a disallowed object. However, if the video camera wanders off of the allowed object and the cue fails to correct the problem, turning off the video camera, at least temporarily, is effective to train the platform to maintain the proper alignment to the allowed object to perform the task at hand. The length of time the video camera is turned off can vary in order to more effectively train the local or remote user or robot.

In different embodiments, instead of just being based on their content, objects may be defined and disallowed based on other attributes. For example, any object that is identified as having a distance from the video camera that is either too close or too far may be designated as disallowed. The rate of motion (e.g., velocity and acceleration) of the video camera may be defined as an object and disallowed if the rate of motion exceeds a maximum value.

A video processor 144 processes video signal 120 to form video out signals 146 for a display 148 or transmission. If no disallowed objects are detected the video out signals 146 will be normal video signals. If an interrupt was issued, the video out signals 146 may receive no video signal if power was interrupted, may receive a blank or noisy video signal if the ROIC is deactivated or may receive a video signal in which the pixels corresponding to the disallowed objected are removed or obscured.

Figure 5:
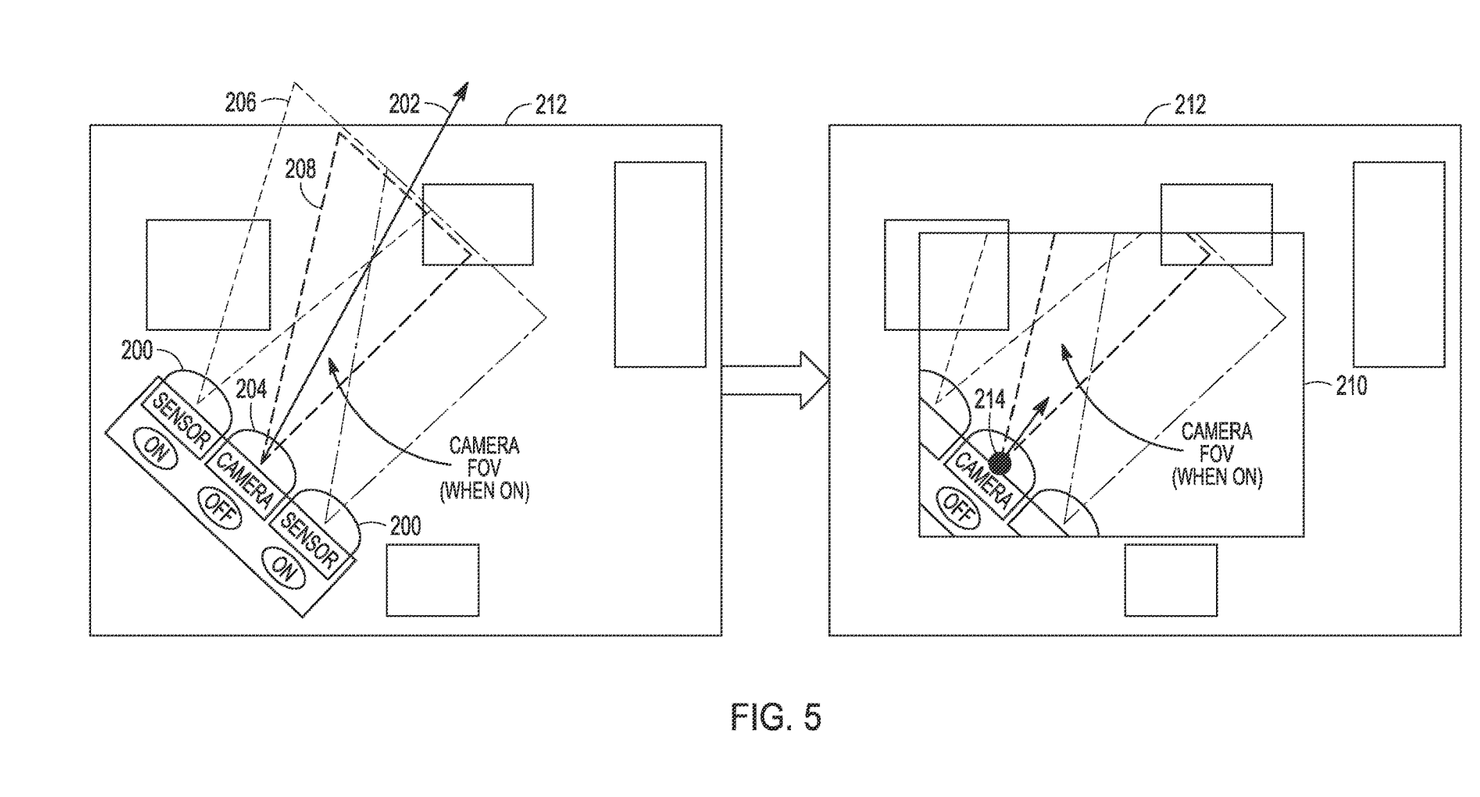
FIG. 5 is an illustration of a sensor self-generated map referenced aligned against the ground truth map to determine the 6 DOF pose.

Referring now to FIG. 5, one approach to determine the video camera's 6DOF pose is to use a sensor 200 that shares a pointing direction 202 with a video camera 204. As shown in this example, a pair of 3D sensors 202 are positioned to either side of video camera 204 to provide a sensor FOV 206 that encompasses and is aligned to a camera FOV 208. During operation and control of video camera 204, sensors 202 capture a 3D sensed signal and form a self-generated map 210 in sensor FOV 206. The interrupt processor matches the 3D sensed signal to a 3D ground truth map 212 (generated by the same sensors) to determine a pose 214 for the current frame of the video camera. A Simultaneous Localization and Mapping (SLAM) algorithm (or similar) may be employed to self-locate, and, subsequently, the self-generated map 210 is referenced and aligned against the ground truth map 212 to determine precise location and orientation.

In an AR environment the pointing direction of the video camera is slaved to field technician motion (e.g., technician's head in the case of goggles or hands in the case of a hand-held unit). A video signal is captured within a FOV of an object in a local scene at arm's length from the technician. The technician receives hand gestures for manipulation of the object from an expert at a remote location, which are registered and overlaid on the video signal to create an augmented reality to instruction the user in manipulation of the object. In different implementations, the hand gestures are provided when an expert views and responds to the video signal captured and transmitted to the remote field location by the technician's video camera in real-time, when an expert interacts with a replica of the object in real-time or when an expert generates "canned" instructions offline by either responding to a video or interacting with a replica of the object.

The concern is that the technician may turn away from the object of interest, intentionally or unintentionally, and capture video of another portion of the scene or object that should not be captured or transmitted. The present invention provides a system and method for automatically and under technician/customer/master ("user") control controlling the video camera in such a constrained AR environment to exclude portions of a scene for data capture and transmission compliance without interfering with the AR overlays that instruct the technician in manipulation of the object.

Figure 6:
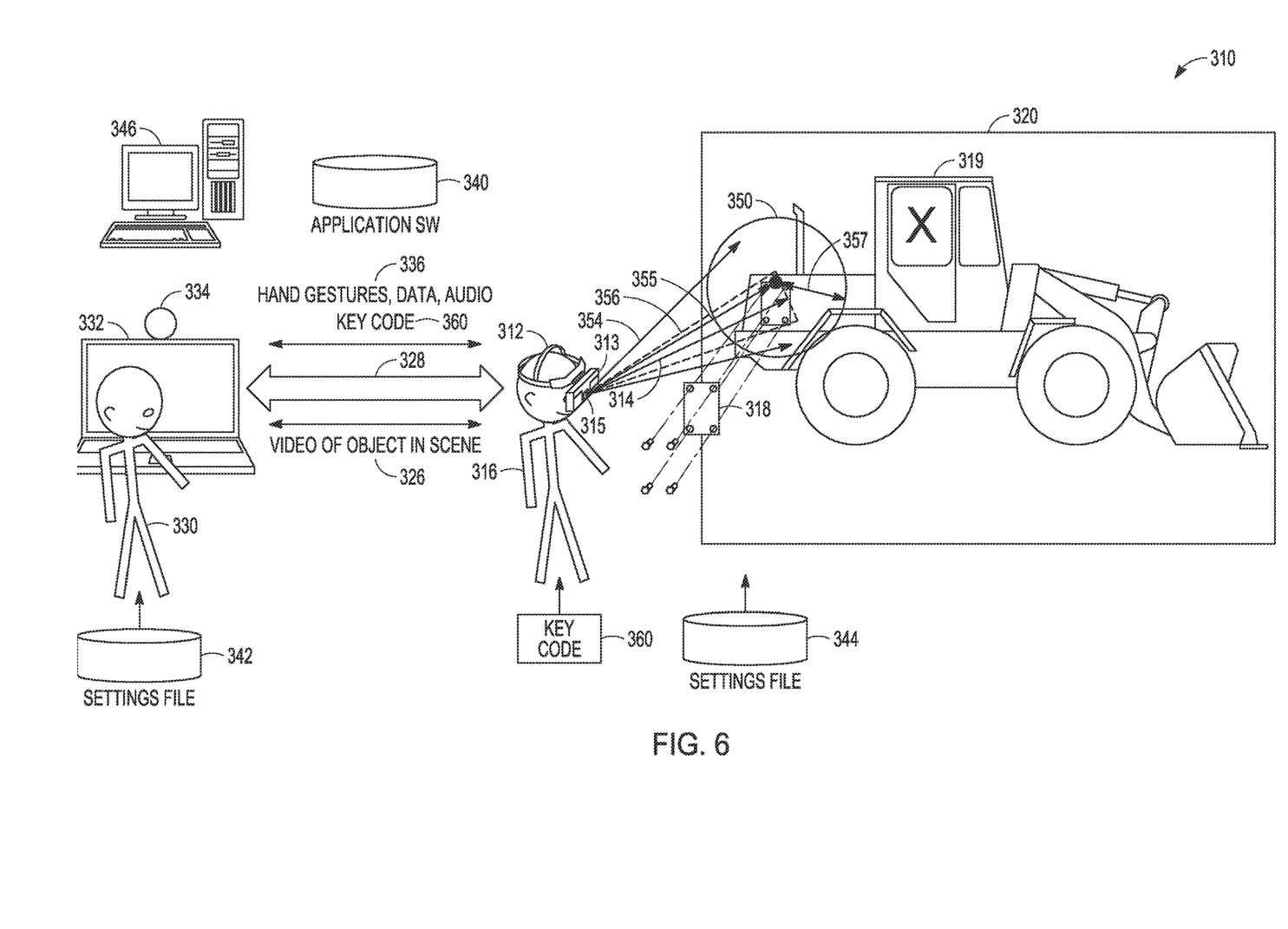
FIGS. 6 and 7 are illustrations of an embodiment of an Augmented Reality (AR) system in which a predicted FOV for the video camera provides for predictive cueing and enforcement of an alignment condition to an allowed objected and to prevent capture of disallowed objects.
Figure 7:
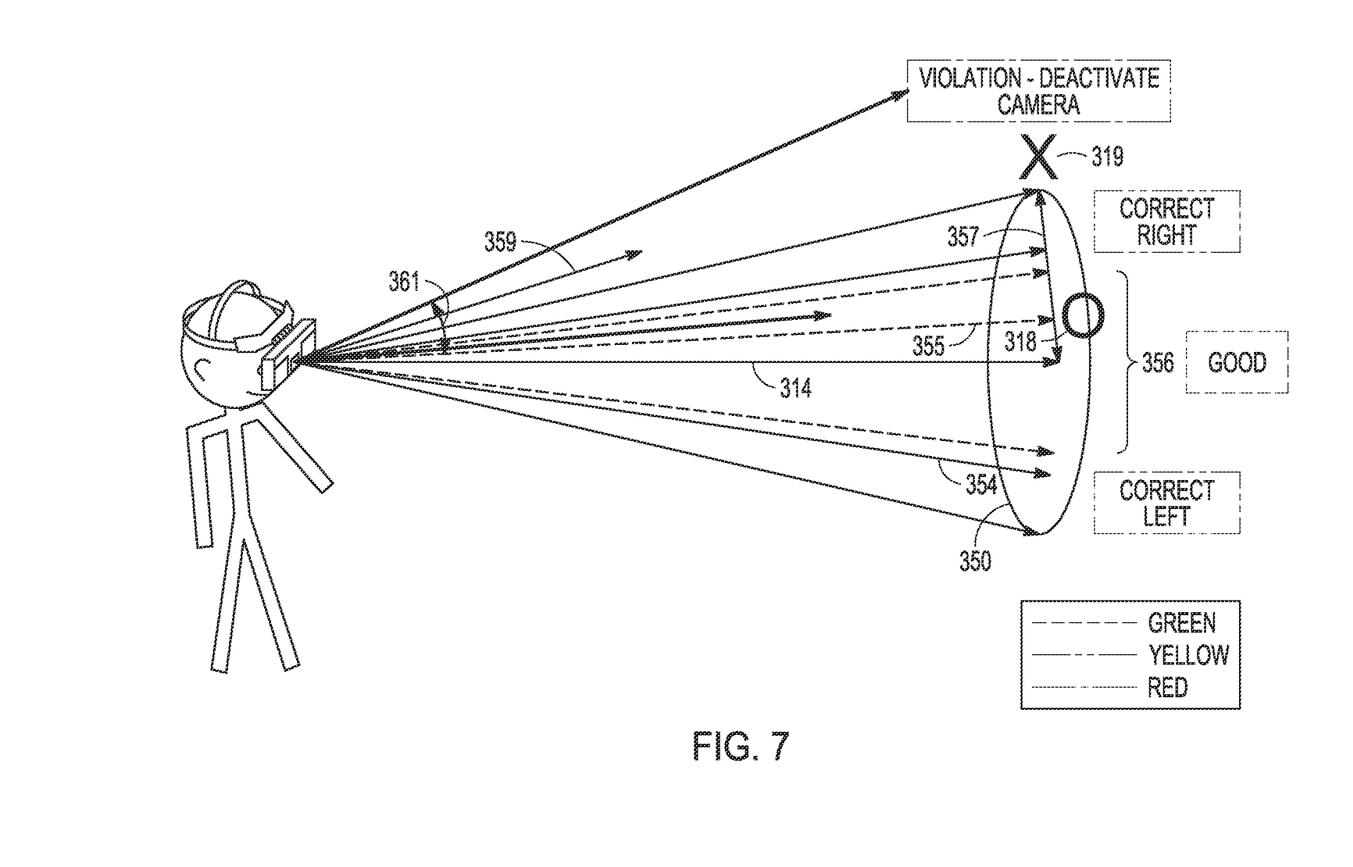

With reference to FIGS. 6 and 7, an embodiment of an AR system 310 includes a video capture, display and transmission device 312 such as a pair of video goggles or a hand-held unit (e.g. a tablet or cell phone) whose pointing direction 314 is slaved to technician motion (e.g., where a field technician 316 is looking or pointing the unit). Field technician 316 manipulates an object 318 in a local scene 320 to, for example, perform maintenance on the object or receive instructions on how to operate the object. In this example, object 318 is an access panel and the local scene includes a tractor. The access panel is an "allowed" object. For purposes of illustration, the cabin 319 is a "disallowed" object.

Device 312 includes a 3D sensor 313 (e.g. a 3D camera, LIDAR or sonar) that captures a sensed signal and a video camera 315 that captures imagery of object 318 in local field scene 320 and transmits a video signal 326 over a communications link 328 or network to a remote site, possibly in a different country. Sensor 313 and the sensed signal are isolated from communications link 328 or the network. Video signal 326 is presented to an expert 330 on a computer workstation 332, which is provided with a device 334 to capture the expert's hand gestures. Expert 330 manipulates the object in the video with his/her hands (or via a tool) to perform the task. Device 334 captures the hand gestures, which are converted to animated hand gestures 336 and transmitted back over communications link 328 to user 316 where they are registered to and overlaid on the display. Expert 330 may provide instructions in the form of audio, text or other media in addition to or instead of the hand gestures to support the AR environment. The AR environment itself is implemented with application software 340 and settings files 342 and 344 on the remote and local computer systems 332 and 312 and a server 346.

In accordance with the invention, the AR system or method determines whether the pointing direction 314 of the local video capture and display device 312 satisfies an alignment condition 350 to allowed object 318. Alignment condition 350 relates the camera pointing direction 314 to a line-of-sight (LOS) 355 to the allowed object. The two must remain with a specified misalignment 357 given as an angle or distance to the allowed object 318. The misalignment 357 may be fixed e.g. plus or minus 5 degrees, set by the user.

One or more technician/customer, master or expert key codes 360 are used to identify the technician/master/expert, define pairing of the allowed object and specify tolerances that define the alignment condition 350. A key code allows the field technician/customer/master or an expert to control the video camera to protect the field technician from capturing and/or transmitting data in the scene that would violate customer or country policies or legal requirements. The key code may allow the holder of the code to specify via, for example, thru a GUI allowed or disallowed objects or may pre-load those selections for a given local scene or task. To establish the alignment condition, a user might specify a 24" distance, which creates a circle with a 24" radius about the LOS to the allowed object. Alternately, the user might specify a plus/minus 5 degrees of misalignment for the pointing direction, which for the nominal arm's length working distance might create, for example, a circle with a 12" radius. Instead of or in addition to specifying a distance or angle, the user might specify and place additional markers (disallowed objects) in the scene about the allowed object that define the outer boundary or tolerance of the alignment condition. Activation of the video capture and display device 312 would require successful pairing with at least the identified allowed object. Another expert controlled key code may be provided at the remote location to the field technician to ensure that no non-complying data is transmitted and received at the remote location. This key code is enforced at the field technician's AR system. In addition to distances, the key code may also prepopulate a known set of allowed or disallowed shapes.

3D sensor 313 captures a sensed signal within a sensor FOV 354 to generate a 3D ground truth map in which the allowed object 318 and disallowed object 319 are indicated and located. Video camera 315 captures light within a camera FOV 356 that is read out and stored as images in the memory chip where the images are formed into the video signal. The interrupt processor updates the pose of the video camera for the current frame, computes a predicted pose 359 for one more predicted camera FOV 361 for future frames and compares those predicted camera FOV to the ground truth map to recognize and locate allowed 318 or disallowed 319 objects. An interrupt processor determines, using the detected sensed signal or gyroscope measurements for example, whether the pointing direction 314 satisfies the alignment condition 350 to allowed object 318 and whether the video camera's FOV 356 or predicted camera FOV 361 do or shortly will include the disallowed object 319.

As regards satisfaction of the alignment condition to the allowed object 318, as long as the technician looks in the direction of the allowed object 318 the allowed object is captured in the camera FOV 356 and the alignment condition is satisfied (green "Good") thereby enabling the camera to capture imagery and form the video signal. As the technician's eyes (camera) begin to wander, the allowed object gets close to the edge of alignment condition 350 (yellow "Correct Left" or "Correct Right") thereby causing a cue (audio, video, vibration) to be issued as a reminder to the technician to maintain his or her focus on the allowed object 318 and the task at hand. The camera remains enabled and video is captured for transmission and display. If the technician's LOS wanders too far, the predicted camera FOV 361 loses pairing with allowed object 318 thereby violating the alignment condition 350 and causing the video camera to be disabled and a cue (red, "Deactivate Camera") to be issued. The length of time the video camera is disabled can be controlled to "train" the technician to maintain his or her focus on the allowed object.

As regards preventing the capture of disallowed object 319 in the video signal, if disallowed object 319 is captured in the predicted camera FOV 361 similar cues can be issued before issuing an interrupt to control the video camera such that any camera images containing disallowed object 319 are not transferred to the memory chip and thus not included in the video signal including interrupting power to the video camera, disable the top electrochemical layer in the detector array or disabling the ROIC. A cue e.g., red "Deactivate Camera" or similar can be issued to the technician to notify the technician of the violation as to the disallowed object and to prompt the technician to change his or her LOS.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of preventing capture and transmission of excluded data in a local scene from a video signal, said method comprising:

generating a ground truth map (GTM) of the local scene including one or more objects;

identifying one or more of the objects in the GTM as disallowed;

using a video camera to capture a video signal at a frame rate within a camera field-of-view (CFOV) in a pointing direction in the local scene, said camera FOV capturing a portion of the local scene within the GTM without any disallowed objects;

determining a pose including a location and an orientation of the video camera within the local scene for a current frame;

receiving measurements of velocity and acceleration of the video camera's pointing direction;

computing one or more predicted FOV (PFOV) for one or more future frames from the pose for the current frame and the measurements of velocity and acceleration, said one or more PFOV capturing one or more different portions of the local scene within the GTM;

comparing the one or more PFOV to the GTM to recognize and locate disallowed objects outside the CFOV for the current frame; and if a disallowed object is recognized, controlling the video camera to prevent capture of disallowed objects within the CFOV and their inclusion in the one or more future frames of the video signal.

2. The method of claim 1, further comprising:

providing a sensor that is isolated from and independent of the video camera; and using the sensor to generate the GTM of the local scene.

3. The method of claim 2, wherein the ground truth map is three-dimensional, wherein the sensor is one of a 3D video camera, LIDAR or Sonar.

4. The method of claim 2, wherein the ground truth map includes a computer generated 2D or 3D model of at least one of the disallowed objects.

5. The method of claim 2, wherein the ground truth map is three-dimensional, further comprising:

using the sensor to capture a sensed signal within a three-dimensional sensor FOV (SFOV) along the pointing direction;

comparing the sensed signal within the three-dimensional sensor FOV to the three-dimensional ground truth map to determine the pose for the current frame.

6. The method of claim 2, further comprising:

distributing the video signal to a network; and isolating the sensor from the network.

7. The method of claim 1, further comprising:

measuring a rate of motion of an object entering the local scene; and if the measured rate of motion exceeds a maximum value, deactivating the video camera.

8. The method of claim 1, wherein a gyroscope on the video camera determines the pose for the current frame.

9. The method of claim 1, wherein if a disallowed object is recognized in the one or more PFOV, generating a cue to change the video camera pointing direction to prevent capture of disallowed objects and their inclusion in the one or more future frames of the video signal;

after generating the cue, updating the predicted FOV to determine whether the updated predicted FOV includes the disallowed object;

if the cue fails to prevent capture of the disallowed object in the updated predicted FOV, then controlling the video camera to prevent capture of the disallowed object and its inclusion in the video signal.

10. The method of claim 9, wherein one of a user, a user controlled robot or an autonomous robot are responsive to the cue to change the video camera pointing direction.

11. The method of claim 1, wherein one or more of the objects in the ground truth map as allowed, further comprising:

determining whether the current and a predicted pointing direction satisfy an alignment condition to an allowed object;

if either the current or predicted pointing directions fail to satisfy the alignment condition, generating a cue to change the video camera pointing direction to enforce the alignment condition;

after generating the cue, updating the current and predicted pointing directions to determine whether they satisfy the alignment condition to the allowed object; and if the cue fails to enforce the alignment condition, deactivating the video camera.

12. The method of claim 11, wherein the local scene is an augmented reality (AR) environment, further comprising:

receiving from a remote location instructions in the form of audio, text, or video media related to the allowed object; and registering the instructions to the video signal and displaying an augmented reality to a user to instruct the user, wherein the pointing direction of the video camera is slaved to user motion;

wherein the cue prompts the user to change the user's pointing direction to enforce the alignment condition.

13. The method of claim 1, wherein said video camera includes a detector array having an electrochemical layer to sense and integrate light to form an image, a read out integrated circuit (ROIC) having an amplifier and an A/D converter to read out a sequence of images at a frame rate and a memory chip to store the sequence of images to form the video signal, wherein the step of controlling the video camera to prevent capture of disallowed objects comprises one or more of, mechanically controlling the video camera to change the pointing direction;

optically controlling the video camera to narrow the CFOV or to blur the disallowed object; and electrically controlling the video camera to interrupt power, disable the electrochemical layer, amplifier or A/D converter or selectively turn off pixels on the disallowed object.

14. The method of claim 1, wherein said video camera includes a detector array having an electrochemical layer to sense and integrate light to form an image, wherein the step of controlling the video camera to prevent capture of disallowed objects comprises disabling the electrochemical layer.

15. The method of claim 1, wherein the step of controlling the video camera to prevent capture of disallowed objects comprises selectively turning off pixels on the disallowed object within the video camera.

16. A method of preventing capture and transmission of excluded data in a local scene from a video signal, said method comprising:

generating a ground truth map (GTM) of the local scene including one or more objects;

identifying one or more of the objects in the GTM as disallowed;

using a video camera to capture a video signal at a frame rate within a camera field-of-view (CFOV) in a pointing direction in the local scene, said camera FOV capturing a portion of the local scene within the GTM without any disallowed objects;

determining a pose including a location and an orientation of the video camera within the local scene for a current frame;

receiving measurements of velocity and acceleration of the video camera's pointing direction;

computing one or more predicted pointing directions and predicted FOV (PFOV) for one or more future frames from the pose for the current frame and the measurements of velocity and acceleration, said one or more PFOV capturing one or more different portions of the local scene within the GTM;

comparing the PFOV to the GTM to recognize and locate disallowed objects outside the CFOV for the current frame; and if a disallowed object is recognized, generating a first cue to change the video camera pointing direction to prevent capture of disallowed objects within the CFOV and their inclusion in the one or more future frames of the video signal.

17. The method of claim 16, wherein the GTM includes one or more allowed objects, further comprising:

after generating the cue, updating the predicted FOV to determine whether the updated predicted FOV includes the disallowed object;

if the first cue fails to prevent capture of the disallowed object in the updated predicted FOV, controlling the video camera to prevent capture of the disallowed object and its inclusion in the video signal.

18. The method of claim 16, wherein the GTM includes one or more allowed objects, further comprising:

determining whether the current and predicted pointing directions satisfy an alignment condition to an allowed object;

if either the current or predicted pointing directions fail to satisfy the alignment condition, generating a second cue to change the video camera pointing direction to enforce the alignment condition;

after generating the first or second cues, updating the current and predicted pointing directions and predicted FOV to determine whether they satisfy the alignment condition to the allowed object and whether the updated predicted FOV includes the disallowed object; and if either the first or second cue fails to enforce the alignment condition or prevent capture of the disallowed object, deactivating the video camera.

19. A method of preventing capture and transmission of excluded data in a local scene from a video signal, said method comprising:

generating a ground truth map (GTM) of the local scene including one or more objects;

identifying one or more of the objects in the GTM as allowed;

using a video camera to capture a video signal at a frame rate within a camera field-of-view (CFOV) in a pointing direction in the local scene, said camera FOV capturing a portion of the local scene within the GTM without any disallowed objects;

determining a pose including a location and an orientation of the video camera within the local scene for a current frame;

receiving measurements of velocity and acceleration of the video camera's pointing direction;

computing one or more predicted pointing directions for one or more future frames from the pose for the current frame and the measurements of velocity and acceleration determining whether the current and predicted pointing directions satisfy an alignment condition to an allowed object; and if either the current or predicted pointing directions fail to satisfy the alignment condition, generating a first cue to change the video camera pointing direction to enforce the alignment condition.

20. The method of claim 19, further comprising:
after generating the first cue, updating the current and predicted pointing directions to determine whether they satisfy the alignment condition to the allowed object; and
if the first cue fails to enforce the alignment condition, deactivating the video camera.

21. The method of claim 1, wherein the GTM is generated and the one or more disallowed objects are identified and then the video camera is used to capture the video signal.

22. The method of claim 1, further comprising:
measuring a rate of motion of the video camera relative to the local scene; and
if the measured rate of motion exceeds a maximum value, deactivating the video camera.

23. The method of claim 2, wherein the sensor is configured to capture a sensed signal within a sensor FOV (SFOV) along the pointing direction, wherein the SFOV encompasses the CFOV to capture a larger portion of the local scene than the CFOV.

24. The method of claim 2, wherein the sensor is configured to capture a sensed signal during use of the video camera, further comprising processing the sensed signal to disallow objects in the one or more PFOV based on object attributes, wherein said objects are not identified as disallowed in the GTM.

25. A method of preventing capture and transmission of excluded data in a local scene from a video signal, said method comprising:
Providing a sensor that is isolated from and independent of a video camera;
Using the sensor to scan the local scene to generate a ground truth map (GTM) including one or more objects;
identifying one or more of the objects in the GTM as disallowed;
once the GTM is generated and the one or more objects identified as disallowed,
using a video camera to capture a video signal at a frame rate within a camera field-of-view (CFOV) in a pointing direction in the local scene, said camera FOV capturing a portion of the local scene within the GTM;
determining a pose including a location and an orientation of the video camera within the local scene for a current frame;
receiving measurements of velocity and acceleration of the video camera's pointing direction;
computing one or more predicted FOV (PFOV) for one or more future frames from the pose for the current frame and the measurements of velocity and acceleration, said one or more PFOV capturing one or more different portions of the local scene with the GTM;
comparing the one or more PFOV to the GTM to recognize and locate disallowed objects outside the CFOV for the current frame; and
if a disallowed object is recognized, controlling the video camera to prevent capture of disallowed objects within the CFOV and their inclusion in the one or more future frames of the video signal.

26. The method of claim 25, further comprising:
measuring a rate of motion of an object entering the local scene and thus not captured as part of the GTM; and
if the measured rate of motion exceeds a maximum value, deactivating the video camera.

27. The method of claim 25, wherein if a disallowed object is recognized, generating a cue to change the video camera pointing direction to prevent capture of disallowed objects and their inclusion in the one or more future frames of the video signal;
after generating the cue, updating the predicted FOV to determine whether the updated predicted FOV includes the disallowed object;
if the cue fails to prevent capture of the disallowed object in the updated predicted FOV, then controlling the video camera to prevent capture of the disallowed object and its inclusion in the video signal.

28. The method of claim 25, wherein one or more of the objects in the ground truth map as allowed, further comprising:
determining whether the current and a predicted pointing direction satisfy an alignment condition to an allowed object;
if either the current or predicted pointing directions fail to satisfy the alignment condition, generating a cue to change the video camera pointing direction to enforce the alignment condition;
after generating the cue, updating the current and predicted pointing directions to determine whether they satisfy the alignment condition to the allowed object; and
if the cue fails to enforce the alignment condition, deactivating the video camera.

* * * * *

UNITED STATES PATENT AND TRADEMARK OFFICE
CERTIFICATE OF CORRECTION

| | |
|---|---|
| PATENT NO. | : 11,696,011 B2 |
| APPLICATION NO. | : 17/507111 |
| DATED | : July 4, 2023 |
| INVENTOR(S) | : Tacy et al. |

It is certified that error appears in the above-identified patent and that said Letters Patent is hereby corrected as shown below:

On the Title Page

On page 2, in Column 2, under "Other Publications", Line 6, delete "Respoonse" and insert --Response-- therefor On page 2, in Column 2, under "Other Publications", Line 40, delete "Capturie" and insert --Capture-- therefor On page 2, in Column 2, under "Other Publications", Line 44, delete "Capturie" and insert --Capture-- therefor In the Specification In Column 7, Line 38, delete "object" and insert --object.-- therefor In Column 7, Line 38, before "The", insert a linebreak In the Claims In Column 13, Line 31, in Claim 13, delete "of," and insert --of:-- therefor Signed and Sealed this
Twenty-fourth Day of September, 2024

*Katherine Kelly Vidal*
Katherine Kelly Vidal
*Director of the United States Patent and Trademark Office*